US008276447B2

(12) United States Patent
Montanari et al.

(10) Patent No.: US 8,276,447 B2
(45) Date of Patent: Oct. 2, 2012

(54) BALANCING MACHINE FOR BALANCING VEHICLE WHEELS

(75) Inventors: Marco Montanari, Campegine (IT); Roberto Nicolini, Rio Saliceto (IT)

(73) Assignee: Sicam S.R.L., Correggio (RE) (IT)

( * ) Notice: Subject to any disclaimer, the term of this patent is extended or adjusted under 35 U.S.C. 154(b) by 483 days.

(21) Appl. No.: 12/585,254

(22) Filed: Sep. 10, 2009

(65) Prior Publication Data

US 2010/0071464 A1    Mar. 25, 2010

(30) Foreign Application Priority Data

Sep. 12, 2008  (IT) .................................. MO08A0231

(51) Int. Cl.
*G01M 1/08*     (2006.01)
*G01D 7/00*     (2006.01)
(52) U.S. Cl. ......................................... 73/462; 73/866.3
(58) Field of Classification Search .................... 73/460, 73/462, 468, 866.3
See application file for complete search history.

(56) References Cited

U.S. PATENT DOCUMENTS

| | | | | | |
|---|---|---|---|---|---|
| 4,154,112 A | * | 5/1979 | Hofmann | ........................ | 73/462 |
| 4,336,715 A | * | 6/1982 | Arnold et al. | .................. | 73/462 |
| 4,348,885 A | * | 9/1982 | Mueller | ........................ | 73/1.14 |
| 4,489,607 A | * | 12/1984 | Park | ................................ | 73/462 |
| 4,535,411 A | * | 8/1985 | Blackburn et al. | ............ | 700/279 |
| 4,817,003 A | * | 3/1989 | Nagase et al. | ................ | 701/124 |
| 4,958,290 A | * | 9/1990 | Kendall et al. | ................. | 73/460 |
| 5,046,361 A | * | 9/1991 | Sandstrom | ...................... | 73/460 |
| 5,311,777 A | * | 5/1994 | Cunningham et al. | .......... | 73/462 |
| 5,412,583 A | * | 5/1995 | Cameron et al. | .............. | 700/279 |
| 5,544,073 A | * | 8/1996 | Piety et al. | .................... | 700/279 |
| 5,915,274 A | * | 6/1999 | Douglas | .......................... | 73/462 |
| 5,969,247 A | * | 10/1999 | Carter et al. | .................... | 73/462 |
| 6,269,688 B1 | | 8/2001 | Kroll et al. | | |
| 6,715,351 B1 | * | 4/2004 | Gerdes et al. | .................. | 73/462 |
| 6,907,781 B2 | * | 6/2005 | Racine | ............................ | 73/462 |
| 7,191,650 B2 | * | 3/2007 | Cunningham et al. | .......... | 73/462 |
| D555,148 S | * | 11/2007 | Mittersinker et al. | ........ | D14/217 |
| 7,312,785 B2 | * | 12/2007 | Tsuk et al. | .................... | 345/156 |
| 2003/0088346 A1 | | 5/2003 | Calkins et al. | | |
| 2006/0042380 A1 | | 3/2006 | Douglas et al. | | |
| 2007/0069571 A1 | | 3/2007 | Matteucci et al. | | |
| 2008/0053223 A1 | | 3/2008 | Montanari | | |
| 2009/0145221 A1 | | 6/2009 | Montanari et al. | | |

* cited by examiner

*Primary Examiner* — Helen C. Kwok
(74) *Attorney, Agent, or Firm* — Stein McEwen, LLP

(57) ABSTRACT

The balancing machine for balancing vehicle wheels comprises a supporting structure of grip and rotation members for gripping and rotating a wheel to be balanced, detection device for detecting the unbalance of the wheel during rotation, a processing unit which is operatively associated to said grip and rotation members and to said detection device, a screen associated to the supporting structure which is operatively associated to the processing unit and adapted to display the detected unbalance data and selectable functions or lists of functions, a control panel having a touch screen control surface arranged in a discrete ring-like manner, is also located on the control panel. The operator slides his finger on the touch screen control surface to scroll between present functions, or lists of functions, displayed on the screen, in a continuous manner. A first button, located in the center of the touch screen, is used to select functions or lists of functions when the control surface is used in a continuous operation mode. A second button, located adjacent the touch screen control surface, pilots the starting and stopping of the detection device.

20 Claims, 1 Drawing Sheet

BALANCING MACHINE FOR BALANCING VEHICLE WHEELS

The present invention relates to a balancing machine for balancing vehicle wheels.

BACKGROUND OF THE INVENTION

It is known that vehicle wheels are, generally, made up of a cylindrical metal rim having, at the axial extremities, annular flanges between which is defined a slot-in fitting channel for an elastic tyre, the side portions of which, so-called "beads" are blocked up firmly against the annular flanges themselves.

The need is also known to carry out frequent balancing operations which consist in fitting weights, made of lead or other material, at predetermined points of the wheel and along the rim.

During wheel rotation, the fitting of the weights offsets the presence of any tyre and/or rim irregularities.

To carry out such operations, balancing machines are commonly used that comprise a supporting structure for wheel gripping and rotation means, of the type of a horizontal shaft that can be turned axially by means of the operation of motor means and on which the wheel rim is keyed.

The measurement of wheel unbalance is determined during rotation by means of suitable electronic or electro-mechanical devices, such as force transducers fitted along the horizontal shaft.

To the unbalance measurement are normally added other characteristic measurements, such as wheel roundness measurement, wheel eccentricity, amount of tread wear, etc., normally made by means of suitable measuring sensors with or without contact (e.g., feelers or optic sensors). Known balancing machines are shown in U.S. Patent Application Publication No. 2007/0069571, published Mar. 29, 2007, U.S. Patent Application Publication No. 2008/0053223, published Mar. 6, 2008, and U.S. Patent Application Publication No. 2009/0145221, published Jun. 11, 2009.

It is also known that such balancing machines have suitable interface means suitable for allowing interaction with the machine by an operator during unbalance measuring operations and during the subsequent balancing operations.

Such interface means are linked to the balancing machine electronics and allow the interaction between the operator and the machine control software.

The interface means generally comprise a monitor fixed to the supporting structure of the machine and suitable for displaying information relating to unbalance measurements and information such as to guide the operator during the balancing operations.

The interface means also comprise a keyboard with a plurality of keys that can be used by the operator to modify the measuring settings before determining the unbalance, or to allow the operator to display and manage the collected data, after determining the unbalance.

The use of a keyboard however does not always allow making the measurement settings or displaying the data in a fast and intuitive way.

To overcome such drawback, the use is known of control panels personalised according to the specific operations that can be performed by means of the balancing machine, which have one or more buttons and a touch-screen surface made, for example, using capacitive technology.

By running a finger over the touch-screen surface, the operator can, generally speaking, move among different menus of the machine software application displayed on the monitor screen.

Pressing the buttons, on the other hand, allows selecting the functions inside the menus and starting specific processing or measuring operations.

One known solution, in particular, envisages the presence of a control panel with a touch-screen annular surface.

Running a finger on such annular surface, either clockwise or anticlockwise, results in the scrolling from left to right or from right to left among predefined menus or functions displayed by the software application installed on the balancing machine.

These known balancing machines however are susceptible to upgrading.

In fact, the combined use of the touch-screen surface and of one or more buttons is not always easy and quick.

Furthermore, scrolling among all the available menus and options until the desired selection is made can require a fair amount of time, something that considerably affects the total measurement time of a wheel unbalance and balancing.

BRIEF SUMMARY OF THE INVENTION

The main aim of the present invention is to provide a balancing machine for balancing vehicle wheels in which the interface means can be used in a quick and intuitive way.

Another object of the present invention is to provide a balancing machine for balancing vehicle wheels which allows to overcome the mentioned drawbacks of the background art in the ambit of a simple, rational, easy, effective to use and low cost solution.

The above-described objects are achieved by the present balancing machine for balancing vehicle wheels, comprising a supporting structure for supporting grip and rotation means for gripping and rotating a wheel to be balanced, detection means for detecting the unbalance of the wheel during rotation, at least a processing unit which is operatively associated to said grip and rotation means and to said detection means, at least a screen which is associated to said supporting structure and which is operatively associated to said processing unit and adapted to display the detected unbalance data and selectable functions or lists of functions, and at least a control panel for the selection of said functions or lists of functions having at least a touch-screen control surface, characterised in that it comprises control means for controlling the operation of said control surface between a continuous operating mode, in which the touching of said control surface between two positions leads to scrolling between said functions or lists of functions, and a discrete operating mode, in which on said control surface is determined at least a discrete portion and the touching of said discrete portion leads to the selection of one of said functions or lists of functions.

Other characteristics and advantages of the present invention will become more evident from the description of a preferred, but not sole, embodiment of a balancing machine for balancing vehicle wheels, illustrated purely as an example but not limited to the annexed drawings.

DETAILED DESCRIPTION OF THE INVENTION

Figure 1:
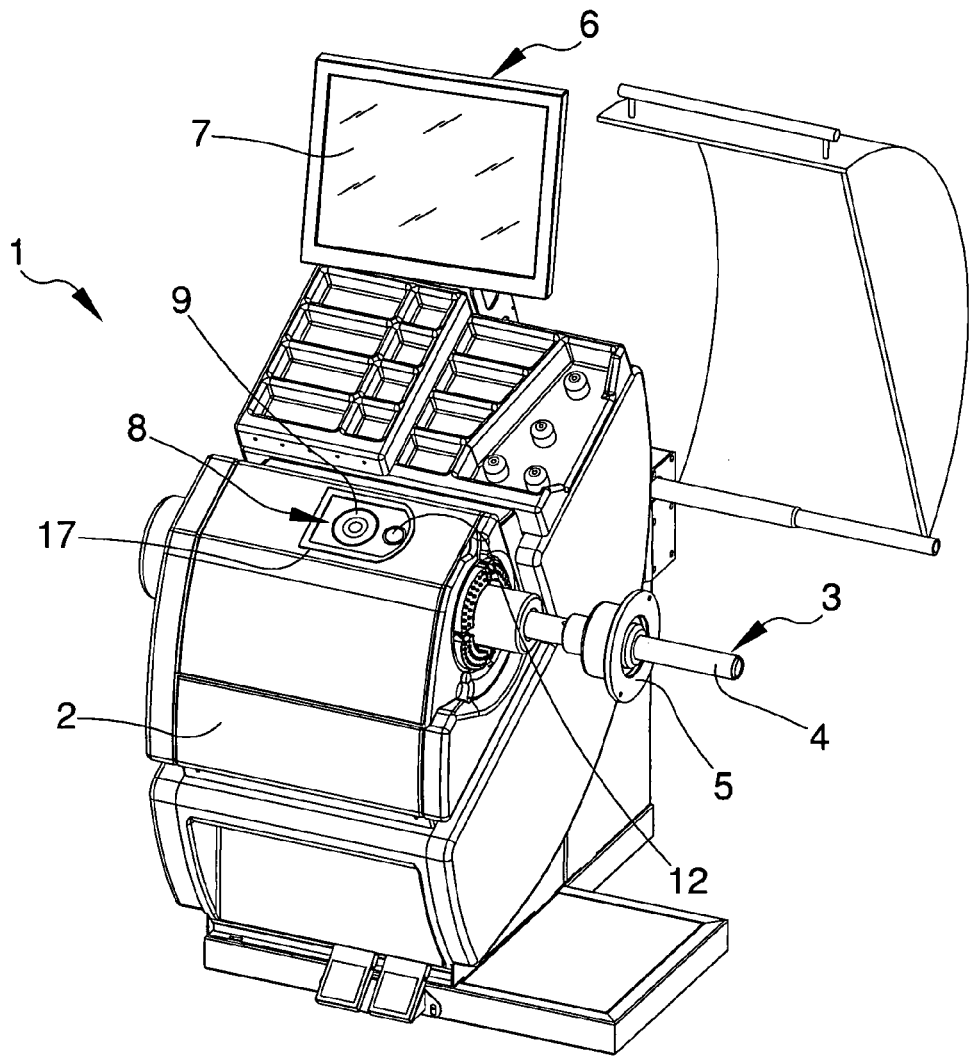
FIG. 1 is an axonometric view of the machine according to the invention.
Figure 2:
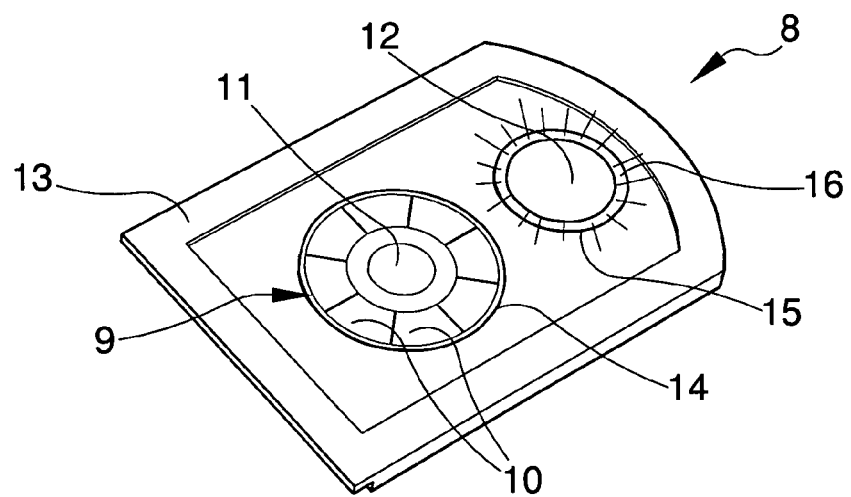
FIG. 2 is an axonometric view of the control panel of the machine according to the invention.

With reference to such figures, by 1 is globally indicated a balancing machine for balancing vehicle wheels is identified, generally, by reference numeral 1.

The machine 1 comprises a supporting structure 2 which supports grip and rotation means 3 for gripping and rotating a wheel to be balanced around a substantially horizontal rotation axis.

In particular, the supporting structure 2 houses motor means of the type of an electric motor or the like to operate the grip and rotation means 3.

The grip and rotation means 3, in particular, comprise a shaft 4 that protrudes horizontally and overhanging from the supporting structure 2. The free extremity of the shaft 4 has a bushing 5 able to fix and centre the rim of the wheel to be balanced.

The machine 1 also comprises detection means, not shown in FIG. 1, suitable for detecting the unbalance of the wheel to be balanced fitted on the shaft 4 during the rotation of same.

In particular, such detection means can comprise one or more force transducers, such as load cells or the like, associated along a section of the shaft 4 and suitable for detecting changes in the forces generated by the wheel along the shaft 4 during rotation.

Machine 1 may also include further detection means, composed of sensors of the type with or without contact such as feelers, optical sensors or laser distance sensors, suitable for detecting, e.g., the profile of the wheel.

The machine 1 also comprises a processing unit, such as a microprocessor system or the like, operatively associated with the grip and rotation means 3 and with the detection means.

The machine 1 has interface means 6, 8 associated with the supporting structure 2 and suitable for allowing the interaction, with the machine 1, by an operator assigned to balancing.

In particular, such interface means comprise a monitor 6 fixed to an upper portion of the supporting structure 2, operatively associated with the processing unit of the machine 1 and having a screen 7 of the LCD (Liquid Crystal Display) type. The use of different types of monitor 6 cannot however be ruled out.

The screen 7 is suitable for displaying the detected unbalance data of a wheel to be balanced and for displaying selectable functions or lists of functions.

In particular, such selectable functions can be suitably grouped together into different lists and can be selected, e.g., to change the display settings of the detected unbalance data, to change the detection settings or, again, to start preset processing procedures of such detected data.

Control means of the machine 1, composed of a dedicated software application, together with the processing unit, are suitable for piloting the grip and rotation means 3, for storing and processing the unbalance data found and displaying on the screen 7 the processed data and the selectable functions or lists of functions.

Advantageously, the interface means 6, 8 of the machine 1 comprise a control panel, generally indicated by the reference 8, having a touch-screen control surface 9 for the selection of the aforementioned functions or lists of functions.

The control surface 9, in particular, can be of the type of a touch-screen surface made with capacitive technology and, in point of fact, all the operator has to do is slide a finger along this control surface 9 to enable movement between the different functions and lists of functions displayed by the machine control means on the screen 7.

Advantageously, the software application installed on the machine 1 controls the operation of the control surface 9 between a continuous operating mode and a discrete operating mode.

In the continuous operating mode, by touching the control surface 9 without detaching the finger between two distinct positions leads to the scrolling on the screen 7 between the functions or the lists of functions displayed. This enables the operator to select the required functions in an intuitive way.

In the discrete operating mode, the control surface 9 is split into several discrete portions 10 and touching with a finger on one of such discrete portions 10 for a preset time leads to the selection of a specific function or list of functions.

In particular, the position of such discrete portions 10 on the control surface can correspond or in any case be easily traced to the position of certain selectable functions and represented inside a graphic interface displayed on the screen 7.

If necessary, such discrete portions 10 can also be distinguishable visually on the control surface 9 itself by means of suitable surrounds and/or symbols.

Usefully, the software application of the machine 1 is able to dynamically associate each of the discrete portions 10 with a respective function or list of functions represented graphically on the screen 7.

Furthermore, the software application is able to dynamically determine the perimeter and the position of such discrete portions 10 on the control surface 9, according to the particular graphic interface displayed on the screen 7 and, therefore, so as to reproduce the position of the functions or lists of functions graphically represented on the screen 7.

This way, the selection of the functions or the lists of functions can be made by the operator in a quick and intuitive way.

With particular, but not sole reference to the embodiment shown in the illustrations, the control surface 9 is ring shaped and split into a series of discrete portions 10.

This way, sliding a finger on the annular control surface 9 in a clockwise or anti-clockwise direction produces left to right or right to left scrolling between preset functions or lists of functions displayed on the screen 7 by the software application installed on the balancing machine 1.

The touching with a finger of one of such discrete portions 10 for a preset time, on the other hand, leads to the selection of a specific function or list of functions shown in corresponding positions on the screen 7.

Different shapes of the control surface 9 cannot however be ruled out, which for example can have an elongated profile, and a different number or a different layout of the discrete portions 10 cannot be ruled out.

Usefully, a first button 11, of the type of a capacitive technology touch-screen button, is arranged at the centre of the ring defined by the control surface 9 and is useable, for example, to select functions or lists of functions when the control surface 9 is used in the above continuous operation mode.

Usefully, the control panel 8 comprises a further second bi-functional button 12, with a substantially circular profile, which is operatively associated with the above processing unit and is suitable for piloting the start and stop of the wheel unbalance detection means and, therefore, for starting and stopping the wheel unbalance (or different) data collection and processing processes.

Similarly to the first button 11, the second button 12 can also be of the type of a capacitive technology touch-screen button.

Advantageously, the control panel 8 comprises a support 13 fixed to the supporting structure 2 and having a first housing 14 and a second housing 15 suitable for accommodating the control surface 9 with the respective first button 11 and the second button 12 respectively.

Usefully, the support 13 is substantially plate shaped, and the control surface 9 and the second button 12 are arranged side by side.

Usefully, the control panel has a light indicator 16 suitable for indicating the start and stop condition of the detection means and, therefore, of the wheel unbalance measurement and processing operations.

In particular, the light indicator 16 comprises a plurality of LEDs arranged in ring conformation along the perimeter of the second button 12 and suitable for changing colour according to the start and stop condition of the unbalance measurement operations.

Advantageously, the control panel 8 can comprise an electric connector, not shown in the illustrations, fixed to the rear of the support 13 and suitable for electronically connecting the control surface 9, the first button 11 and the second button 12 to the processing unit and to the power circuit of the machine 1.

The support 13 is fixed inside a suitable seat 17 on the supporting structure 2, defined at a front and upper portion so as to allow easy access to the control surface 9 and to the first and second buttons 11 and 12.

Usefully, such seat 17 is shaped to completely reproduce the profile of the support 13, so as to allow the measured fitting of the support 13 itself which, therefore, appears visually fully integrated with the rest of the supporting structure 2.

It has, in point of fact, been ascertained how the described invention achieves the proposed objects and, in particular, the fact is underlined that the presence of the touch-screen control surface, usable both in continuous operation mode and in discrete operation mode, allows scrolling and selecting in a quick and intuitive way the functions available for measuring the unbalance of a wheel or for processing and displaying the detected unbalance data.

What is claimed is:

1. A balancing machine for balancing vehicle wheels, comprising a supporting structure for supporting grip and rotation means for gripping and rotating a wheel to be balanced, detection means for detecting the unbalance of the wheel during rotation, at least a processing unit which is operatively associated to said grip and rotation means and to said detection means, at least a screen which is associated to said supporting structure and which is operatively associated to said processing unit and adapted to display the detected unbalance data and selection functions or lists of functions, and at least a control panel for the selection of said functions or lists of functions having at least a touch-screen control surface, wherein said machine comprises control means for controlling the operation of said control surface between a continuous operating mode, in which the touching of said control surface without removing one's finger between two positions leads to scrolling on said screen between said functions or lists of functions, and a discrete operating mode, in which on said control surface is determined at least a discrete portion and the touching of said discrete portion with a finger leads to the selection of one of said functions or lists of functions, said control means being able to dynamically associate said discrete portion with a respective function or list of functions represented graphically on said screen and to dynamically determine the perimeter and the position of said discrete portion or said control surface, according to a particular graphic interface displayed on said screen, so as to reproduce the position of the functions of list of functions graphically represented on said screen.

2. The machine according to claim 1, wherein said control surface is substantially ring shaped.

3. The machine according to claim 1, wherein said control surface has a substantially elongated profile.

4. The machine according to claim 1, wherein said control surface is split into a plurality of discrete portions.

5. The machine according to claim 1, wherein said control panel comprises a support associated to said supporting structure and provided with said control surface.

6. The machine according to claim 5, wherein said support is substantially plate-shaped.

7. The machine according to claim 5, wherein said control panel comprises at least a first button associated to said support, operatively associated to said processing unit and adapted to select at least one of said functions or lists of functions in said continuous operating mode.

8. The machine according to claim 7, wherein said control surface has a substantially ring shape and said first button is arranged substantially at the centre of said ring.

9. The machine according to claim 7, wherein said first button is of a touch-screen button type.

10. The machine according to claim 7, wherein said control panel comprises at least one second button associated to said support, operatively associated to said processing unit and adapted to pilot the start and the stop of said detection means for detecting the wheel unbalance.

11. The machine according to claim 10, wherein said control surface and said second button are arranged side by side.

12. The machine according to claim 10, wherein said second button is of a touch-screen button type.

13. The machine according to claim 1, wherein said control panel comprises at least a light indicator to indicate the start or the stop condition of said detection means for detecting the wheel unbalance.

14. The machine according to claim 13, wherein said light indicator comprises a plurality of LEDs arranged along at least a section of the perimeter of said second button.

15. The machine according to claim 5, wherein said control panel comprises at least an electrical connector associated to said support and electronically associated to said processing unit and to said control surface.

16. The machine according to claim 7, wherein said control panel comprises at least an electrical connector associated to said support and electronically associated to said processing unit and to said first button.

17. The machine according to claim 10, wherein said control panel comprises at least an electrical connector associated to said support and electronically associated to said processing unit and to said second button.

18. The machine according to claim 5, wherein said supporting structure comprises at least a seat for housing said support.

19. The machine according to claim 18, wherein said seat is shaped to reproduce at least in part the profile of said support.

20. The machine according to claim 18, wherein said seat is defined at a front upper portion of said supporting structure.

* * * * *